United States Patent

Chang et al.

[11] Patent Number: 5,581,238
[45] Date of Patent: Dec. 3, 1996

[54] PACIFIER WITH FEVER HEAT ALARM DEVICE

[76] Inventors: Mei-Hui Chang; Wang-Jung Chih, both of 7F, No. 53, Lane 72, Kuang-Fu S. Rd., Taipei; Shih-Yi Chang, No. 250, Chungshan Rd., Pai Ho Chen, Tainan Hsien, all of Taiwan

[21] Appl. No.: 439,630

[22] Filed: May 12, 1995

[51] Int. Cl.$^6$ ........................................... G08B 23/00
[52] U.S. Cl. ........................... 340/573; 128/736; 374/151
[58] Field of Search ............................ 340/573, 586, 340/692, 595, 596, 539, 326; 374/151, 150; 128/736; 606/234–236; 215/11.2

[56] References Cited

U.S. PATENT DOCUMENTS

| | | | |
|---|---|---|---|
| 5,033,864 | 7/1991 | Lasecki et al. | 374/151 |
| 5,109,864 | 5/1992 | Lu | 128/736 |
| 5,186,047 | 2/1993 | Gordon et al. | 374/151 |
| 5,211,479 | 5/1993 | Coffey et al. | 374/151 |
| 5,312,187 | 5/1994 | Chiu | 374/151 |

FOREIGN PATENT DOCUMENTS 8302664  8/1993  WIPO .................................. 128/736

*Primary Examiner*—Thomas Mullen
*Attorney, Agent, or Firm*—Beveridge, DeGrandi, Weilacher & Young, LLP

[57] ABSTRACT

An improved pacifier for a baby which is equipped with a chip-style thermo-sensitive resistor at the tip of the nipple thereof for detecting the oral temperature of a baby; and a liquid crystal display is disposed on the side of the rear portion of the pacifier for display of a detected temperature; and an antenna and a transmitter for delivery of alarm signals which can be received by an amplifying circuit of a receiver housed in a TV set or a stereo set to produce alarm or music or preset words so that parents or adults can be alarmed of the condition of a baby.

6 Claims, 6 Drawing Sheets

PACIFIER WITH FEVER HEAT ALARM DEVICE

BACKGROUND OF THE INVENTION

The present invention relates to an improved pacifier for baby which is characterized by that a thin flexible printing circuit plate is housed in the nipple of a pacifier and a liquid crystal display is disposed at one side of the rear portion of the pacifier, and a battery powered main circuit board having an antenna and a buzzer is also received in the rear portion of the pacifier. A chip style thermo-sensitive resistor is disposed at the tip of the nipple for detecting the temperature of a baby sucking on the pacifier so that the baby's temperature can be monitored and any fever heat of a baby sucking on the pacifier of the present invention can be detected and people can be informed by way of a buzzer or device of the like.

High fever is fatally dangerous to most babies, it can cause many serious diseases and damage the brain of a baby easily if medical treatment is not given in time. Many baby related diseases are not treated in time because of neglect or failure of taking baby's temperature immediately after a fever takes place.

There are a number of conventional temperature taking devices used to measure a baby's body temperature, but most of the prior art devices make a baby uncomfortable, resulting in difficulties of taking accurate temperature in practical operation.

A most relevant prior art device uses a nipple full of liquid which can transfer heat to a temperature detecting spot so as to perform a measurement of the body temperature of a baby.

There are some disadvantages associated with such prior art:
1. The liquid in the nipple can leak out easily if not well sealed.
2. The nipple can be easily broken when constantly bitten by a baby and the liquid can be swallowed by a baby.
3. The temperature taken by such a nipple is not accurate enough.
4. The preset alarm temperature of such prior art nipple is set at 37.8 C. which is taken above the the tongue of a baby; the temperature is equal to 38.5 C. taken at anus of the baby and is relatively too high for a baby.

SUMMARY OF THE INVENTION

The primary object of the present invention is to provide an improved pacifier which is equipped with a temperature measuring means and an alarm signal transmitter which can actuate an alarm means when abnormal body temperature, over 37.2 C. which is a surface temperature of a tongue, of a baby sucking on the pacifier is detected.

Another object of the present invention is to provide an improved pacifier which is equipped with a transmitter which can generate warning signals to remote control a receiver to produce music or vocal sound so as to facilitate a baby sitter or parents to monitor physical condition of a baby.

One further object of the present invention is to provide an improved pacifier which has an ultra-thin flexible sensor printed circuit (FPC) in the nipple of the pacifier of the present invention so that a baby can enjoy the softness of the nipple without feeling a block of circuit board or a temperature detecting means.

One further object of the present invention is to provide an improved pacifier which is equipped with a signal receiver associated with an amplifying circuit of a remote control signals receiver of a stereo system or a TV set so that music or vocal sound or preset words can be produced for warning purpose when a baby's abnormal fever heat is detected.

One still further object of the present invention is to provide an improved pacifier which is equipped with a flashing means or a vibration means so that deaf or dumb people can be notified once a baby's body temperature is abnormal.

DETAILED DESCRIPTION OF THE PREFERRED EMBODIMENTS

Figure 1:
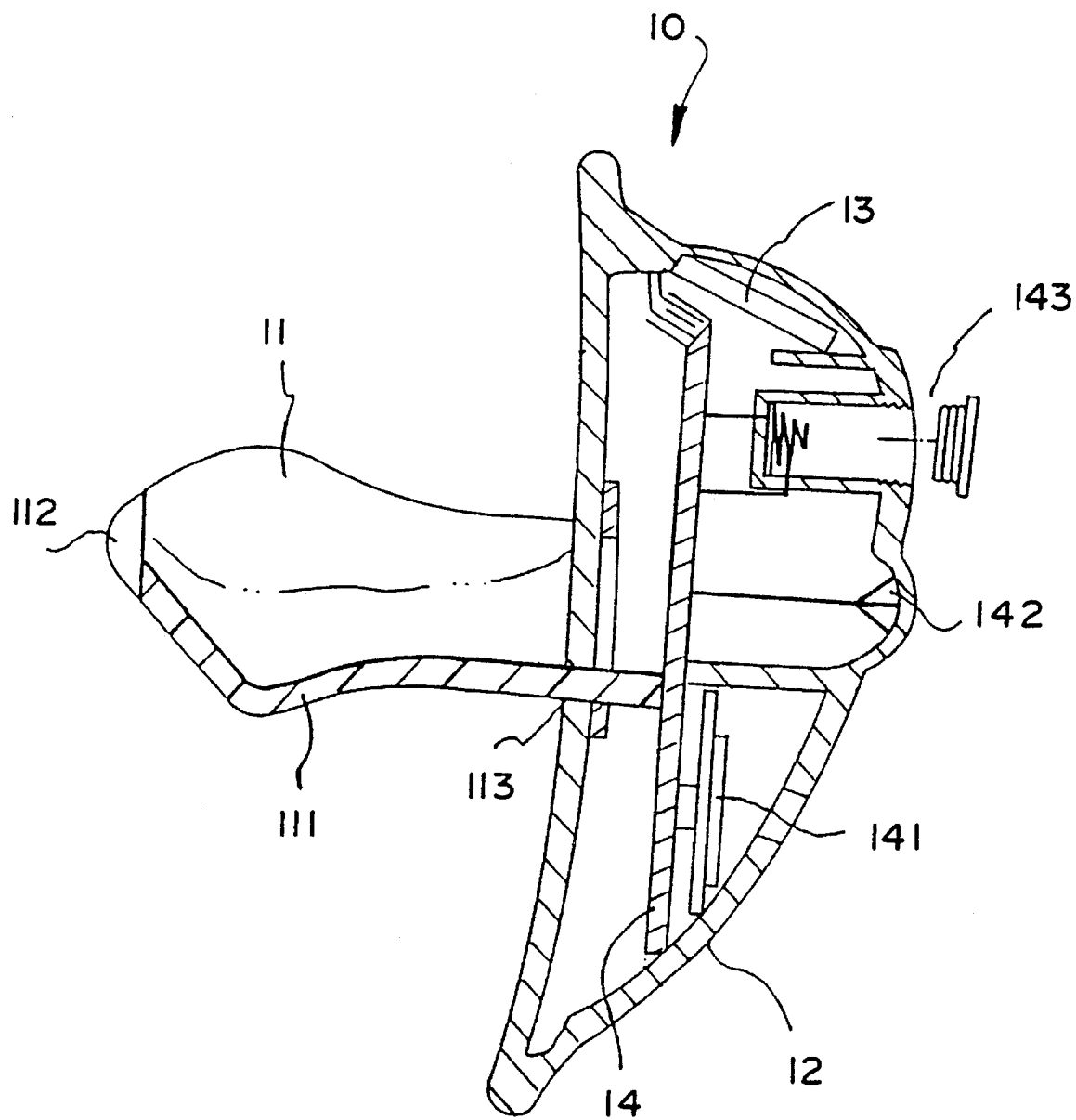
FIG. 1 is a sectional view of the present invention.
Figure 2:
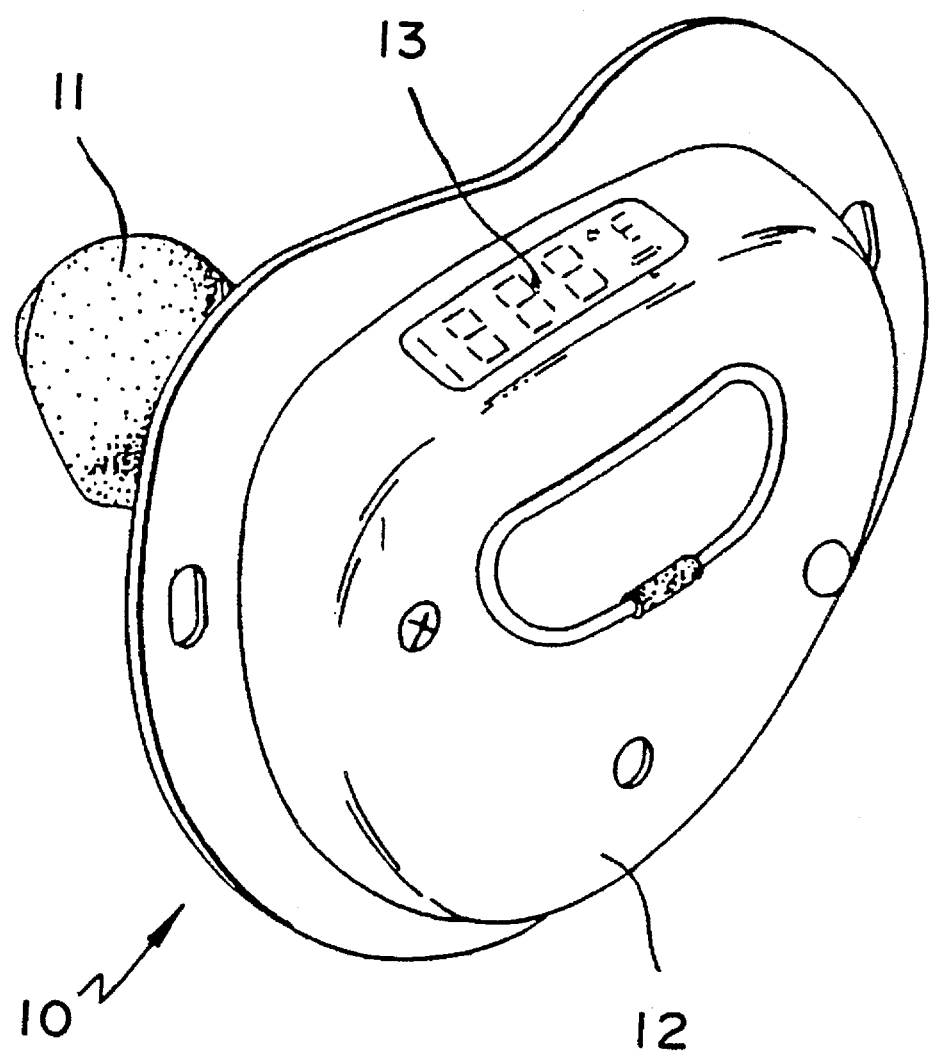
FIG. 2 is a perspective view thereof.

Referring to FIGS. 1, 2, the pacifier 10 of the present invention has a nipple 11 in which an ultra thin flexible sensor printed circuit plate 111 is located; and a protection shield 12 disposed at the end of the nipple 11, having a chamber between the nipple 11 and the protection shield 12. A liquid crystal display 13 is disposed on one side of the protection shield 12. In the chamber of the protection shield 12 is disposed a main circuit board 14 having a battery housing 143, an antenna 142 and a buzzer 141 associated therewith. A chip style thermo-sensitive resistor 112 disposed at the front end of the sensor printed circuit board 111 housed inside the nipple 11 is used to detect the body temperature of a baby. The detected body temperature can be displayed on the crystal indicator 13 by way of the main circuit board 14 and the buzzer 141 in the pacifier 10 can produce alarm sound.

The ultra-thin flexible sensor printed circuit plate 111 FPC which is used on a computer chip available on market is so soft and thin that it will not make a baby uncomfortable in sucking on the pacifier.

The chip style thermo-sensitive resistor 112 available on markets is able to detect body temperature and transmit the same externally.

As shown in FIG. 1, the pacifier 10 is comprised of a front nipple 11 and a rear protection shield 12. The ultra thin flexible sensor printed circuit plate 111 is disposed along the bottom wall of the nipple 11. The front end of the plate 111 is engaged with the chip style thermosensitive resistor 112, and the other end of the circuit plate 111 led through a through hole 113 on the protection shield 12 is connected to the main circuit board 14 for delivery of detected temperatures. In the chamber between the nipple 11 and the protection shield 12 is housed the main circuit board 14. From the top to the bottom of the main circuit board 14 are respectively disposed in order the battery housing 143, the antenna 142 and the buzzer 141.

The battery housing 143 can be made in a form of a cylindrical cavity having a bias spring disposed at the bottom thereof. The opening of the battery housing has a threaded end, permitting a cap to be removably engaged therewith. A hole is disposed on the protection shield 12 so as to permit the antenna 142 to transmit signals. The buzzer 141 is engaged with the main circuit board 14 with a through hole corresponding to the buzzer 141 so as to permit alarm sound to be delivered externally. The liquid crystal display 13 is electrically connected to the main circuit board 14. The detailed circuit of the present invention is clearly shown in FIG. 3.

Figure 3:
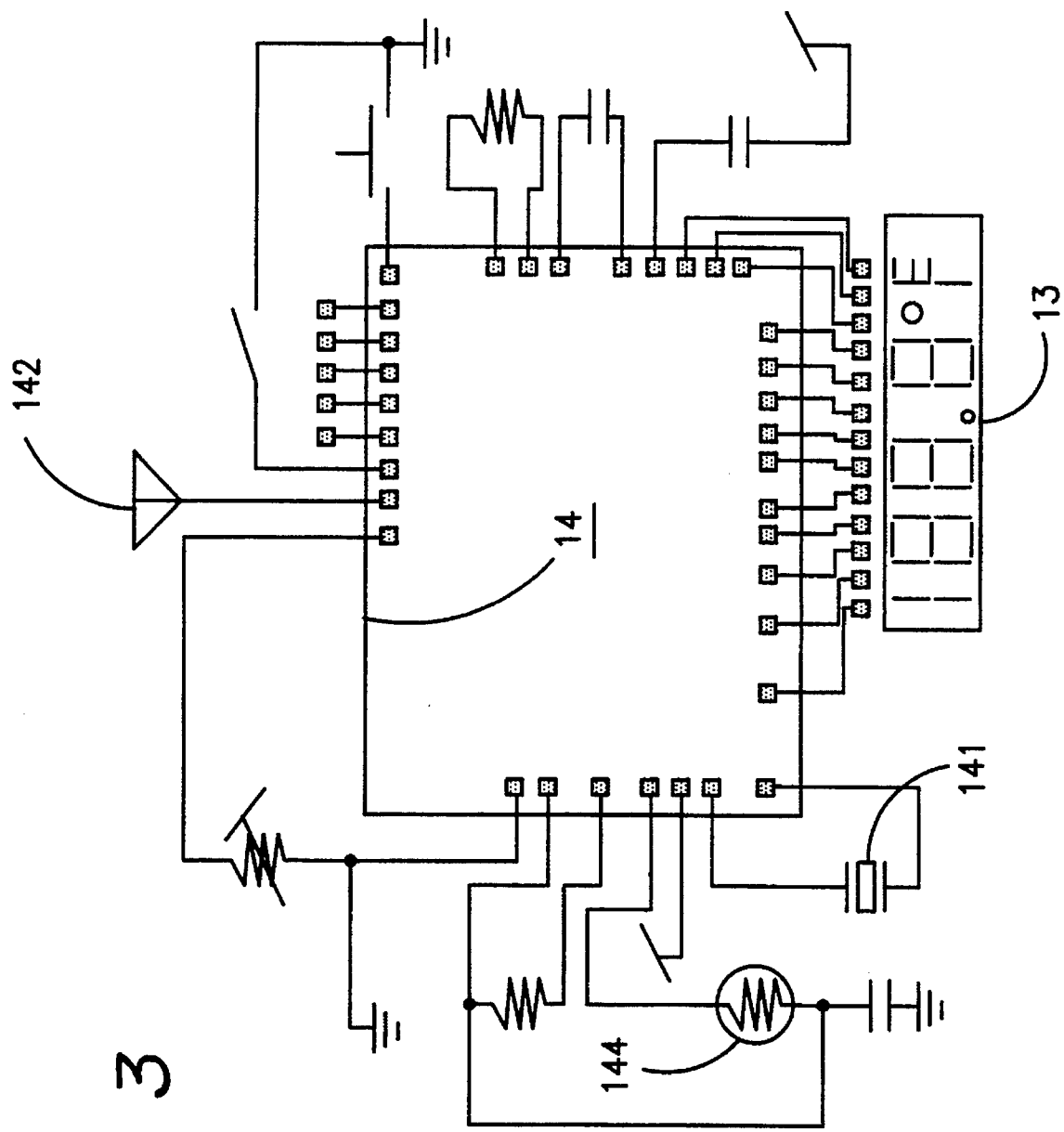
FIG. 3 is a circuit diagram of the present invention.

Referring to FIG. 3, a detecting means 144 is used to take the temperature in a baby's mouth and the detected temperature is delivered to the main circuit for processing and to display the same on the liquid crystal display 13. If the detected temperature is higher than 37.2 C., the preset temperature in the pacifier, alarm signals will be delivered simultaneously externally to the buzzer 141 and the antenna 142 so as to attract the attention of parents or adults.

The normal temperatures taken at different parts of a baby are given as below:

at the surface of a tongue: 36.8 C.
under a tongue: 37 C.
at the armpit: 36.5 C.
at the anus: 37.5 C.

The preset temperature 37.2 C. taken at the surface of a tongue means 0.4 C. higher than the normal temperature of a baby, equal to 37.9 C. taken at the anus of a baby, it indicates that the baby is sick and suffering from fever.

The nipple 11 of the pacifier 10 is located on the surface of a tongue, so the sensor printed circuit plate 111 is extended along the bottom side of the nipple 11.

Figure 4:
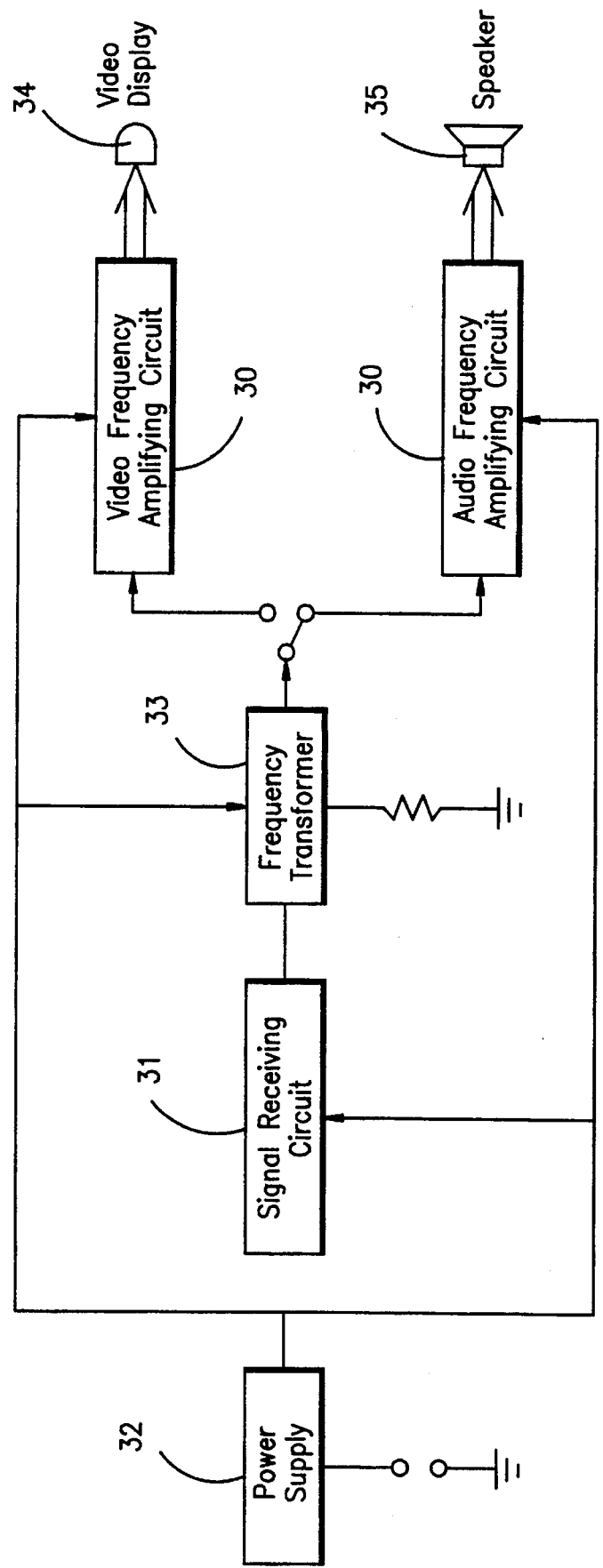
FIG. 4 is a block diagram showing the present invention in cooperation with a TV set or a stereo system.

Referring to FIG. 4, a block diagram showing amplifying circuits 30 for an alarm signal receiver 31 with power supply 32, frequency transformer 33, video display and speaker 35 illustrates the application of the present invention to a video display of a TV set and a speaker of a stereo system.

Figure 5:
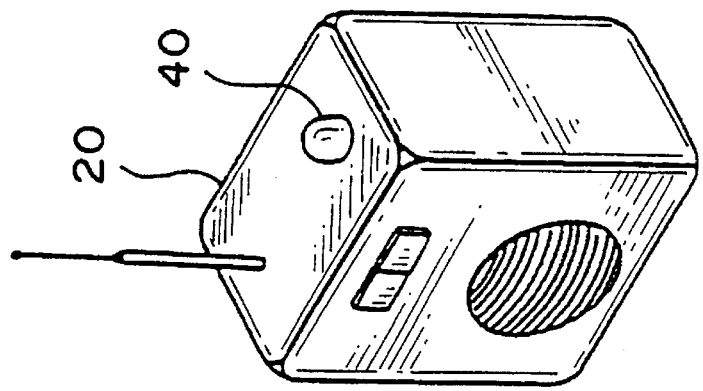
FIG. 5 is a diagram showing the present invention working with an alarm signal receiver.
Figure 5:
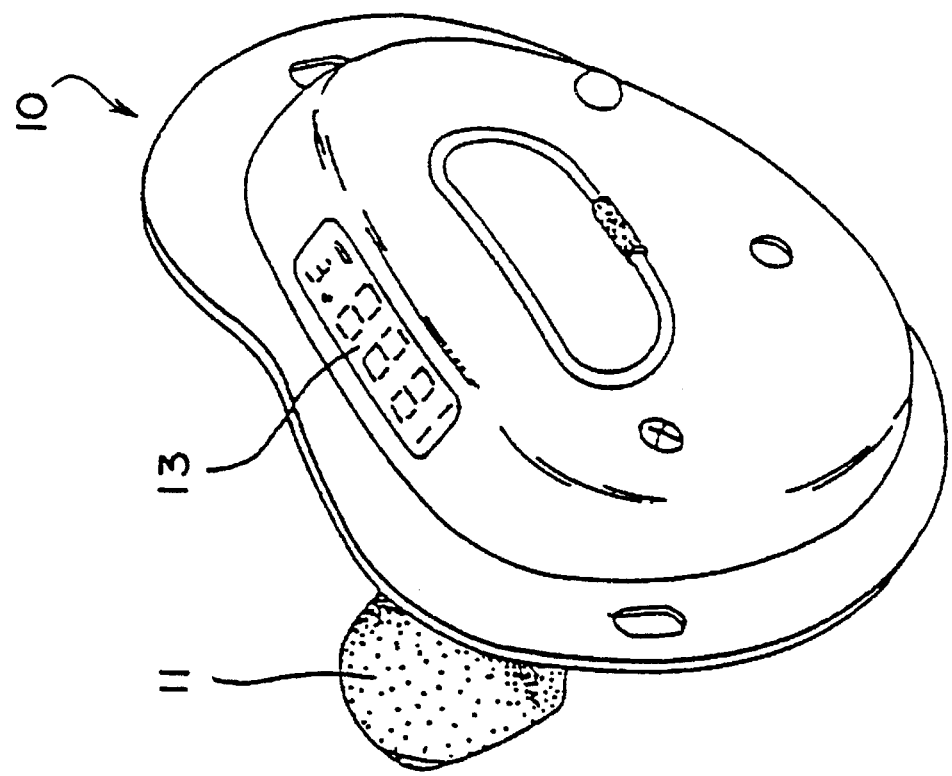

Referring to FIG. 5, in the embodiment, the present invention is provided with a receiver 20 which can receive alarm signals sent by a pacifier 10 and produce alarm sound so that adults in other rooms can be timely informed.

Figure 6:
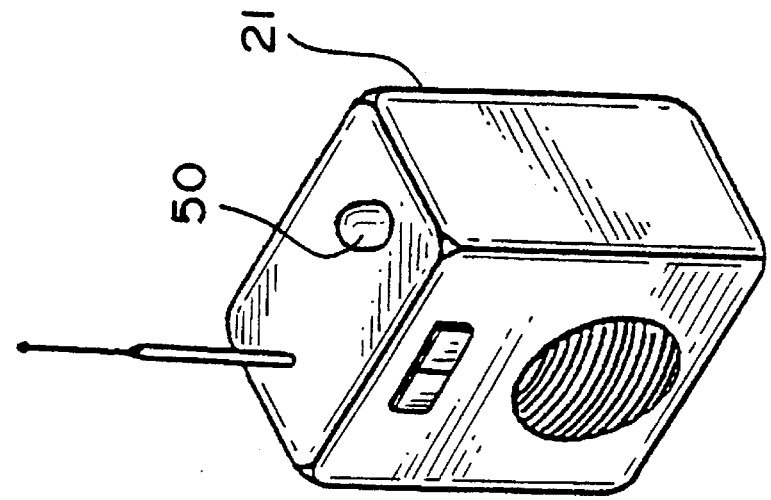
FIG. 6 is a diagram showing the present invention working with a signal receiver with a flashing light on top.
Figure 6:
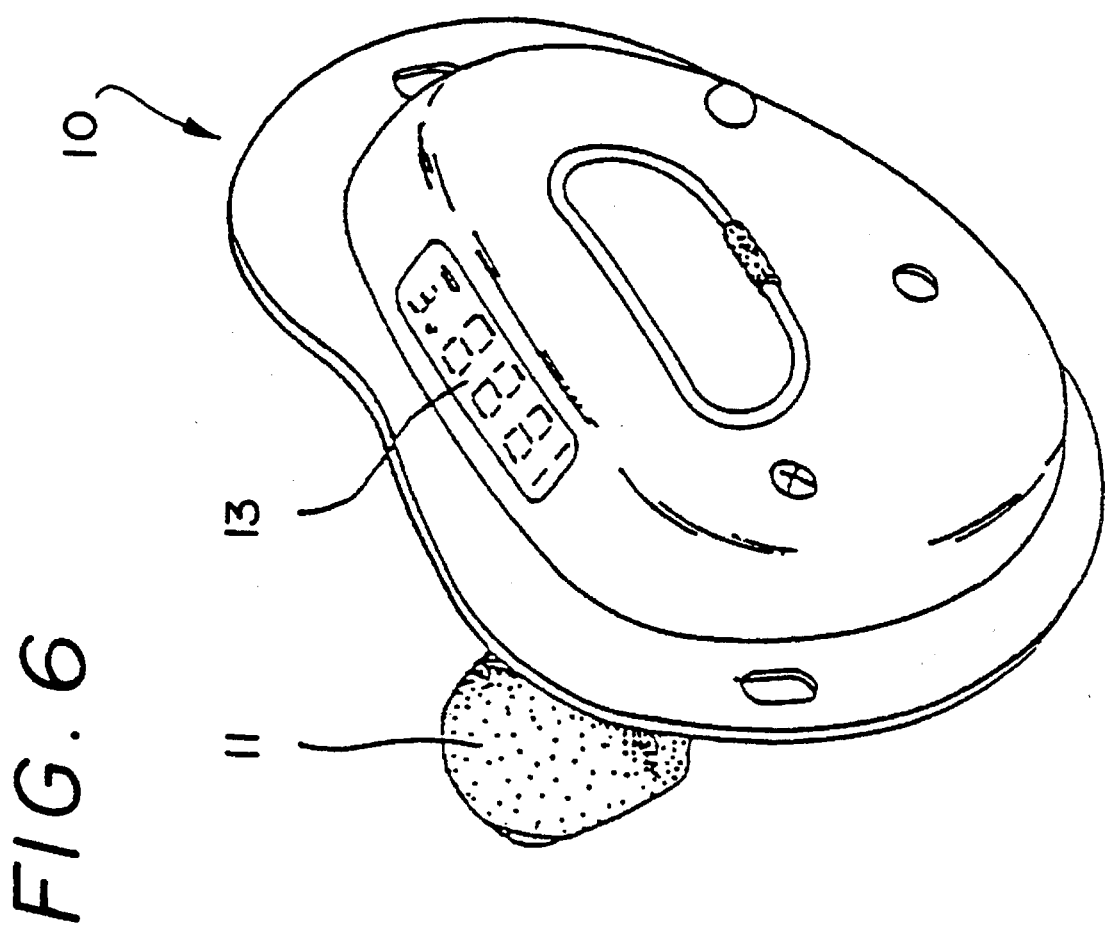

To help deaf and dumb people take care of babies, a flashing device 50 (top of receiver 21 in FIG. 6) or a vibration device 40 (top of receiver 21 in FIG. 5) can be associated with the present invention.

It can be clearly seen that the present invention provide for an improved pacifier which can constantly monitor the temperature of a baby and inform adults of any fever heat of a baby by way of alarm signals of various kinds.

I claim:

1. A pacifier having alarm means for constantly monitoring the temperature of a baby, comprising:

a nipple portion;

a protection shield;

a chamber formed between said nipple portion and said protection shield;

an ultra-thin flexible sensor printed circuit means disposed in said nipple portion along the bottom side thereof;

a thermo-sensitive resistor for detecting the mouth temperature of a baby being connected to an end of said sensor printed circuit means;

another end of said sensor printed circuit means being led through a hole on said protection shield and connected to a main circuit board housed in said chamber;

a battery housing for receiving a battery disposed on said protection shield;

an antenna engaged with said main circuit board and housed in said chamber;

a buzzer engaged with said main circuit board and housed in said chamber; and a liquid crystal display means for displaying a detected temperature engaged with said main circuit board;

wherein a preset alarm temperature is stored in said main circuit board for comparison with a detected temperature.

2. The pacifier as claimed in claim 1 wherein said preset alarm temperature is set at 37.2 degrees C.

3. The pacifier as claimed in claim 1 wherein said alarm signals are transformed into music, vocal sound or signal waves.

4. The pacifier as claimed in claim 1 wherein said antenna delivers alarm signals to actuate a receiver having a signal receiving circuit which produces alarm signals to attract people's attention.

5. The pacifier as claimed in claim 1 wherein said antenna delivers alarm signals to actuate a receiver associated with a TV set or a speaker of a stereo system.

6. The pacifier as claimed in claim 1 wherein a flashing means or vibration means is actuated by alarm signals sent by said antenna.

\* \* \* \* \*